Figure 1:
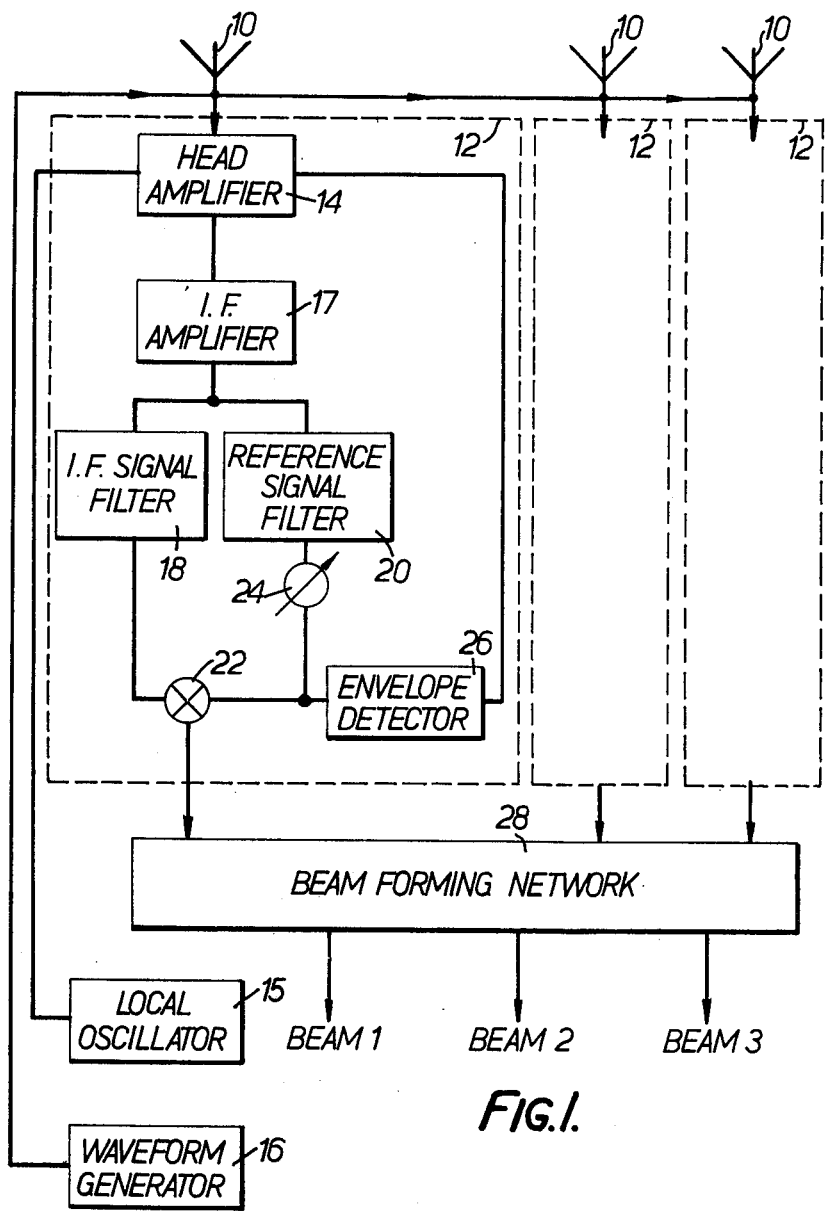

United States Patent [19]

Davies, deceased et al.

[11] 4,060,806
[45] Nov. 29, 1977

[54] PHASED ARRAY RADARS

[75] Inventors: Eric Davies, deceased, late of Danbury, England, by Olivia Maude Davies, co-executor; by Douglas Philip Marr, co-executor, Mevagissey, England

[73] Assignee: The Marconi Company Limited, England

[21] Appl. No.: 686,574

[22] Filed: May 14, 1976

[30] Foreign Application Priority Data

May 14, 1975 United Kingdom .............. 20243/75

[51] Int. Cl.² .............................................. G01S 7/40
[52] U.S. Cl. .............................. 343/17.7; 343/100 SA
[58] Field of Search .......................... 343/17.7, 100 SA

[56] References Cited
U.S. PATENT DOCUMENTS 3,471,855 10/1969 Thompson ......................... 343/17.7
3,964,065 6/1976 Roberts et al. ............. 343/100 SA X
3,967,279 6/1976 Zeger ........................ 343/100 SA X Primary Examiner—T.H. Tubbesing
Attorney, Agent, or Firm—Diller, Brown, Ramik & Wight

[57] ABSTRACT

A phased array radar having a plurality of antennae, each connected with a respective receiving channel, is provided with apparatus to suppress variations in phase and gain in the receiving channels. The apparatus injects a reference signal into a normally provided head amplifier in each channel, which then passes through the same amplification and frequency changing circuits as the signal induced in each antennae. Thus the differential phase shifts of the reference signal and the radar carrier frequency are substantially constant. The gains of the head amplifiers are controlled by the action of an AGC loop.

7 Claims, 3 Drawing Figures

PHASED ARRAY RADARS

This invention relates to phased array radars, that is radars having a plurality of antennae each associated with a respective receiving channel, the relative phases of signals received from a target being dependent upon the bearing of the target.

The use of phased array radars enables space to be scanned without physical rotation of an antenna. One known system utilising phased arrays is that sometimes termed "within pulse scanning radar". In such a radar the signals from the different antennae are applied to respective mixers whose local oscillator frequencies are slightly offset from one another such that the phase difference between adjacent aerials is continuously changing. In such a system, the array has a sensitivity beam which continuously sweeps through space simulating the action of a moving antenna. The system, however, offers the advantages over a moving antenna that mechanical parts, normally more susceptible to failure, are virtually eliminated and furthermore the frequency spectrum associated with clutter is not made to spread on account of the physical movement of the antenna.

Another system which utilises phased arrays includes a plurality of receiving channels whose mixers are fed with the same local oscillator frequencies. The phases of the I.F. frequencies produced by the different channels are combined in a beam forming network to determine the bearing of the target. The beam forming network has a set of inputs connected to receive the I.F. frequencies produced by the different receiving channels and a set of outputs each corresponding to a pedetermined bearing angle. Each of the outputs is connected to all the input signals by means of a phase shifting network which is such that if the phase relationship of the I.F. signals from the different channels corresponds to the bearing associated with that output then all these signals will combine in phase after passing through the network connecting that output to the different inputs. In such a system there is no electronic scanning but depending on the bearing of a target the receivers will produce I.F. signals which combine in phase to produce ideally an output at one of the several outputs of the beam forming network. In practice the channels are weighted in accordance with standard aerial theory to produce the required sidelobe levels at each output of the beam forming network.

In both the radar systems described above, as well as in other phased array radars, it is important to suppress any relative fluctuations both in phase and in gain in the receiving channels since, if sidelobe levels are to be maintained within tolerable limits, the phase shifts and the gains of all the receivers should be matched at all times.

This requirement has already led to the proposal of arranging within each of the receiving channels two negative feedback loops operating on a reference signal artificially injected at the antennae at the end of each p.r.f. period. The two loops are arranged to stabilize, respectively, the phase and the gain of the receiving channels. This proposal, however, is not fully satisfactory for whilst it may achieve the objective of matching the gain and phase characteristics of the receiving channels, the cost of implementation is considerable on account of the number of receiving channels present.

With a view to mitigating the above disadvantage, the present invention provides a phased array radar having a plurality of antennae, a plurality of receiving channels each associated with a respective antennae and including an amplifier and a first frequency mixer, means for adding a reference signal of known frequency to the input of each receiving channel, means in each receiving channel for separating the I.F. frequency corresponding to the reference signal from that corresponding to the signal induced in the antennae and a second frequency mixer for mixing the signals at the outputs of the separating means to generate a second intermediate frequency for utilisation by a beam forming network. In this proposed construction, the reference signal added to the inputs of all the receiving channels passes through the same amplification and frequency changing circuits as the signal induced in each antennae but as the reference signal is of a frequency different from the radar carrier frequency, it will undergo a different phase shift within the receiving channel. However, it is not difficult to ensure that over the frequency range covering the carrier frequency and the reference signal frequency, the group delay of each channel is substantially constant with change in temperature, that is, even though the total phase shifts suffered by the two signals may be different from one another, any differential phase changes between the two signals due to instability in the receiving channels will be substantially constant. It is also feasible and desirable to ensure that the group delay characteristic is substantially the same in all channels so that any differential phase changes between channels are also substantially equal.

In one embodiment of the invention two parallel paths are provided between the first frequency mixer and the second frequency mixer and the separating means comprise a filter tuned to pass the I.F. of the received echo signal in one side path and a further filter tuned to pass the I.F. of the reference signal in the other said path. With such an embodiment preferably the output of the further filter is detected and applied in a feeback path to said amplifier.

In a further embodiment of the invention two parallel paths are provided between the first frequency mixer and the second frequency mixer and the separating means is a filter tuned to pass the I.F. of the reference signal in one of the parallel paths. With this further embodiment preferably the output of the second frequency mixer is applied in a feedback path to said amplifier.

Whilst it has been conventional in the past to ensure that the local oscillator signals applied to the mixing circuits of the different receiving channels are in phase, in the present invention the phase of the local oscillator signals are of no consequence, but if the phase of the reference signal is arbitrary a phase shifter of pedetermined phase shift must be inserted in the path of one of the two signals entering the second frequency mixer to ensure I.F. phase coherence between all the receiving channels.

As the reference signal has very narrow bandwidth it is preferable to insert the phase shifter in the reference signal path between the filter tuned to pass the I.F. of the reference signal and the second frequency mixer.

Where it is desired to incorporate frequency agility within the radar, that is to say in a radar where the carrier frequency of the transmitted beam is changed, for example in order to make jamming more difficult, the pedetermined phase shift provided by the phase shifter is set in accordance with the prevailing carrier frequency, the phase shifter being electronically controlled in synchronism with frequency changes of both the local oscillator and the reference signal.

It is often desirable to modulate the gain of the receiving channels in a radar such that the sensitivity of the receiving channel incrases with increasing target range so as to maintain constant signal amplitude. This considerably reduces the dynamic range needed in the I.F. amplifier. Further it is essential in a phased array radar to maintain the gains of each of the channels in step but such a requirement has hitherto proved difficult to implement.

In accordance with a preferred feature of this invention an A.G.C. loop is operative on the reference signal of each channel and since the reference signal is common to all channels the gains of the channels may be matched.

Preferably, therefore, the reference signal is modulated in amplitude such that the modulation is in synchronism with the radar pulse repetition frequency so that echoes from distant targets are mixed with reference signals of lower amplitude than echoes from nearby targets. The action of the A.G.C. loop acting on the recovered reference signal will now control the amplification such that signals from distant targets are amplified to a greater extent than signals from nearby targets hence mitigating the above problem. In view of the method of minimising drift in phase shift in accordance with the invention no further steps need be taken to ensure correct phasing of all the channels in the phased array radar.

Preferably the reference signal has a frequency approaching that of either the upper or lower sideband of the transmitted radar signal.

Figure 2:
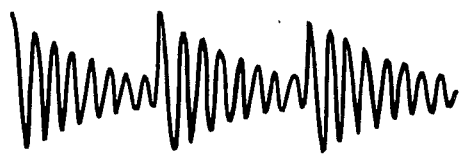
Figure 3:
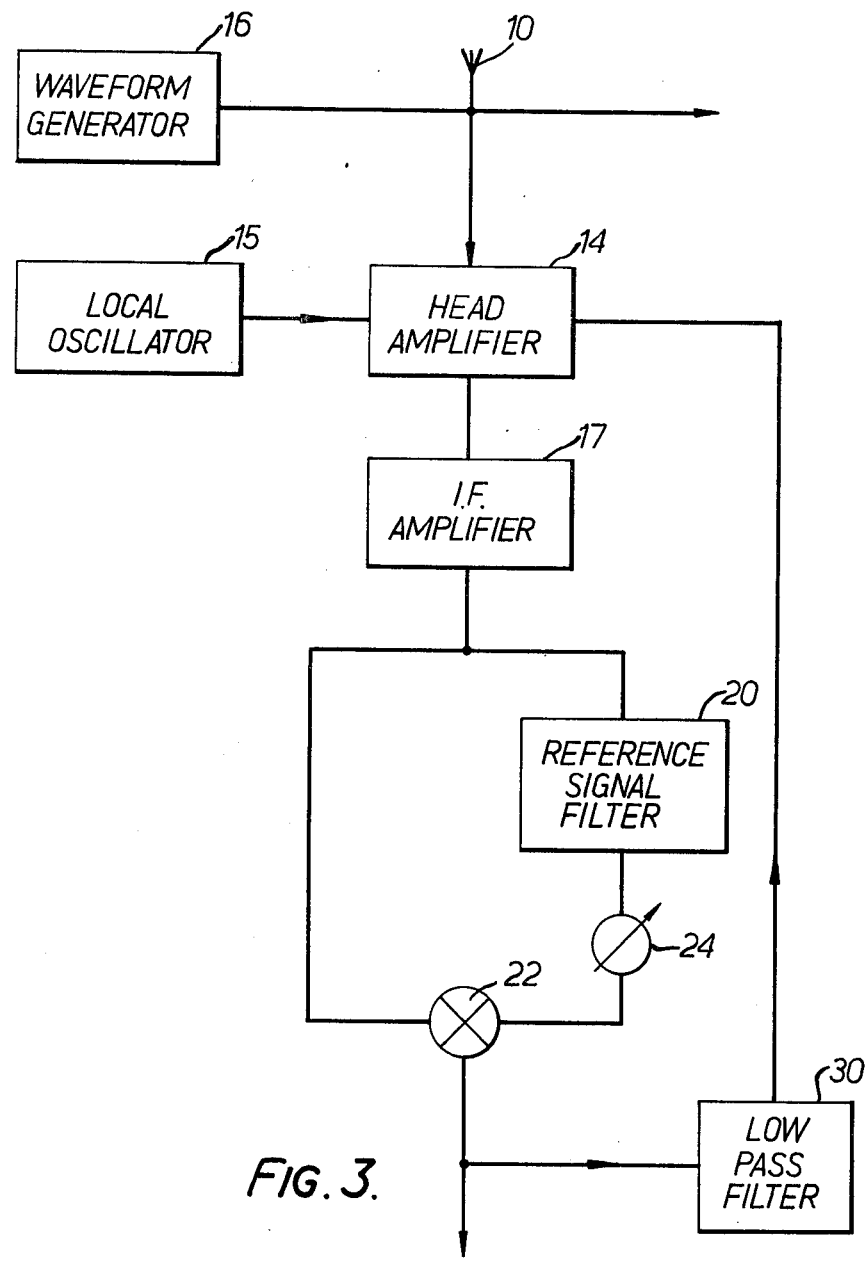

The invention will now be described further, by way of example, with reference to the accompanying drawings in which:

FIG. 1 is a block diagram of one embodiment of a radar in accordance with the invention, FIG. 2 shows the waveform of the reference signal applied in the embodiment of FIG. 1, and FIG. 3 shows a receiving channel of a further embodiment.

In FIG. 1, a phased array radar comprises a plurality of receiving antennae, all of which are numbered 10. Each antennae 10 is connected to a respective receiving channel 12 and as all the receiving channels are identical only one will be described in detail. Each receiving channel includes a head amplifier 14 which comprises the usual r.f. amplifier and frequency changer fed from a common local oscillator 15. Each head amplifier 14 is connected to receive a signal from its associated antennae 10 and also a reference signal derived from a waveform generator 16.

The waveform of the signal produced by the waveform generator 16 is shown in FIG. 2 and consists of a signal of a frequency lying as close as practicable to the upper or lower sideband of the transmitted radar signal compatible with the ability of subsequent filters to filter the reference signal and modulated in amplitude in accordance with a desired swept gain law. Immediately following the transmission of an illuminating pulse by the radar, the reference signal adopts a maximum amplitude which decreases gradually in accordance with the desired law.

The I.F. signals corresponding both to the received echo pulses and the reference signals are amplified in a common I.F. amplifier 17 and are subsequently separated from one another by means of two filters 18 and 20. The output of filter 18, corresponding to the I.F. from the received echo signals is applied directly to a mixer 22, the output of the reference frequency filter 20 being applied to the same mixer 22 by way of a preset phase shifter 24. An envelope detector 26 is connected to receive the output of the present shifter 24 and applies an A.G.C. signal to the head amplifier 14. The outputs of all the mixers 22 in the different receiving channels are applied in parallel to a common beam forming network 28 which operates in the manner earlier described.

In operation, in the presence of a target, echoes from the target are received with different phase at the different antennae 10. These signals are amplified in the head amplifiers 14 and mixed with the signals from the local oscillator 15 to reduce the frequency to a first intermediate frequency I.F.1. Similarly, the reference signal also applied to the input of the head amplifier 14 is amplified and frequency changed in the head amplifier 14. The echo signal and the reference signal are amplified in the I.F. amplifier 17 and are then separated from one another by means of the filters 18 and 20, one of which is tuned to the echo signal and the other to the reference frequency signal. The signals are then subtracted to recover a second intermediate frequency I.F.2. which appears at the output of the mixer 22 and the phase of the output is adjusted by a preset phase shifter 24. If for any reason the phase of the local oscillator 15 tends to drift, then the same phase variation will appear in both the echo signal and the reference signal and upon generation of the difference frequency within the mixer 22 cancellation of the local oscillator phase shift will take place.

The gain of the head amplifier 14 is controlled by the envelope detector 26 in a conventional A.G.C. loop such that the amplitude of the reference signal appearing at the output of the filter 20 remains constant. As the reference signal applied to the head amplifier 14 is itself amplitude modulated, this will mean that the envelope detector 26 will control the gain of the head amplifier 14 in a time periodic manner such that the gain of the amplifier will be at its lowest immediately after transmission of an illuminating pulse increasing gradually as echoes from more distant targets are received. This alteration of the gain will inevitably affect the phase shift suffered by both signals but the change in phase shift suffered by the reference signal and the radar signal will be substantially the same, assuming the group delay of the head amplifier 14 remains constant. The signals from the mixers 22 are now all related in amplitude and phase to the signals received by the different antennae 10 and are substantially immune to variation due to temperature or other instability in the receiving channels.

The outputs of these mixers 22 are applied to the beam forming network 28 which, as previously mentioned, consists of phase shifters and a combining network. Depending on the relative phases of the signals appearing at the outputs of the mixers 22 as determined by the preset phase shifters 24, an output will appear at one of the several outputs of the beam forming network 28 each output corresponding to a pedetermined range of target bearings.

In a further embodiment of the invention shown in FIG. 3 the filter 18 is removed and a connection made between the amplifier 17 and the mixer 22, the detector 26 is removed and the feedback loop to the head amplifier 14 is taken from the mixer 22 output via a low pass filter 30. With such an embodiment the inputs to the mixer 22 are, at one port, the I.F.'s of the echo signal and the reference signal (note, not the sum of the two signals), and, at the other port, the I.F. of the reference signal. The output of the mixer 22 is then representative of the difference of the input signals and a d.c. component which d.c. component is applied via the low pass filter 30 to the head amplifier 14. This embodiment has the advantage over that of FIG. 1 in that variation in gain of the mixer 22—which may change with temperature — is compensated by the feedback loop to the amplifier 14.

It is often required, for example for anti-jamming purposes, to vary the carrier frequency of the radar at will. Hitherto this has proved difficult in a phased array radar but in the embodiment described in the accompanying drawings, this may be achieved if the local oscillator frequency 15 and the frequency of the reference signal are switched in synchronism with changes in the carrier frequency of the radar. With a changing frequency, it is likely that the relative phase shifts of the reference signal and local oscillator will vary because of arbitrary distribution causing the echo signals in the head amplifier 14 and the I.F. amplifier 16 to vary but this may be compensated for by simultantously electronically varying the phase shift provided by the preset phase shifter 24.

I claim:

1. A radar having a plurality of antennae, a plurality of receiving channels each associated with a respective antennae and including an amplifier and a first frequency mixer/generator, means for providing a reference signal of known frequency which is different from the radar carrier frequency to the input of each receiving channel, filter means in each receiving channel for separating the I.F. frequency corresponding to the reference signal from that corresponding to the signal induced in the antennae and a second frequency mixer for mixing the signals at the outputs of the filter means to generate a second intermediate frequency for utilisation by a beam forming network.

2. A radar as claimed in claim 1 wherein two parallel paths are provided between the first mixer and the second frequency mixer and the filter means comprise a filter tuned to pass the I.F. of the received echo signal in one said path and a further filter tuned to pass the I.F. of the reference signal in the other said path.

3. A radar as claimed in claim 2 wherein a detector is provided at the output of the further filter for detecting the envelope of the reference signal and for applying the detected signal in a feedback path to said amplifier.

4. A radar as claimed in claim 1 wherein two parallel paths are provided between the first frequency mixer and the second frequency mixer and the filter means is a filter tuned to pass the I.F. of the reference signal in one of the parallel paths.

5. A radar as claimed in claim 4 wherein the output of the second frequency mixer is applied in a feedback path to said amplifier.

6. A radar as claimed in claim 2 wherein a phase shifter is provided in the reference signal path between the filter tuned to pass the I.F. of the reference signal and the second frequency mixer 7. A radar as claimed in claim 4 wherein a phase shifter is provided in the reference signal path between the filter tuned to pass the I.F. of the reference signal and the second frequency mixer.

* * * * *